UNITED STATES PATENT OFFICE.

WILLI JEROCH, OF BERLIN, GERMANY.

MAGNESIUM CEMENT AND PROCESS OF MANUFACTURING SAME.

No. 833,930.　　　　Specification of Letters Patent.　　　Patented Oct. 23, 1906.

Application filed March 19, 1906. Serial No. 306,812.

*To all whom it may concern:*

Be it known that I, WILLI JEROCH, chemist, a citizen of the German Empire, and a resident of Berlin, Germany, have invented certain new and useful Improvements in Magnesium Cement and Processes of Manufacturing the Same, of which the following is a specification.

This invention relates to the manufacture of a magnesium cement which can be shipped and at the same time is free from hygroscopic salts, more particularly from chlorin compounds. A cement satisfying these conditions is obtained by mixing a dry powder of burnt magnesia, or, speaking chemically, oxid of magnesium, with powdered sulfate of magnesium, any chlorin and alkaline compounds being excluded.

Experience has shown that a mixture of magnesia and magnesium sulfate when mixed with water hardens into a mass of very great solidity. In place of magnesium sulfate there could be used—although less advantageously—sulfates of bases weaker than magnesia, especially sulfate of aluminium or sulfate of zinc, which have similar properties to those of magnesium sulfate. It is essential for the process of this invention that the active components of the mass are mixed together in dry condition, because only in this way a product is obtained which can be directly commercially used and which, moreover, has the property of easily forming a homogeneous paste if intermixed with water, whereas magnesium oxid alone, if added to a solution of magnesium sulfate, is liable to form clots. The solidity of the mass can be still more increased by adding to the mixture of magnesium oxid and magnesium sulfate or magnesium oxid and sulfate of a weaker base than magnesia a small quantity of a soluble salt of lead free from chlorin. The addition of a lead salt results at the same time in the suppression of the appearance of magnesium sulfate crystals on the surface of the hardened cement mass, which otherwise generally appear when the cement is made merely of burnt magnesia and sulfate of magnesium or some other suitable sulfate.

The carrying out of the invention in accordance with my experiments takes place preferably in such manner that seventy-two parts of magnesium oxid, twenty-three parts of magnesium sulfate, and five parts of acetate of lead are used for one hundred parts of the mixture.

I am inclined to suppose that when cement is mixed with water first the sulfate of magnesium acts on the acetate of lead contained in the mixture, owing to the considerable speed of the reaction between these two compounds, and that at the same time a reaction is gradually taking place between the oxid of magnesium and the sulfate of magnesium, a magnesium oxid sulfate being chiefly formed.

The favorable action produced by the addition of acetate of lead is probably due to the fact that sulfate of lead formed, which is precipitated in a very finely divided state, fills up the spaces between the molecules of the magnesia mass, and as sulfate of lead precipitated from a solution generally firmly coheres together it forms a framework for the molecules of magnesium cement, inclosing the said molecules and insuring constancy of volume in the mass.

Although theoretically the acetate of lead is only one of the many known salts of lead, practically scarcely any salt of lead other than acetate of lead need be taken into account, as the latter alone is very soluble and at the same time cheap, apart from the nitrate of lead, which could not be used in this case on account of the danger of the formation of saltpeter. The addition of chlorid of lead is also out of the question, as the proportion of chlorin in the same would give the cement the disadvantageous properties of the Sorel cement, while it is one of the objects of this invention to avoid them.

It is essential for the invention that the cement should contain the above-mentioned compounds, (magnesia, sulfate of magnesium, or the like and perhaps a salt of lead.) It is, on the contrary, possible to add some other ingredients to the cement mixture, which would be used either as filling substances or for attaining certain secondary objects—such as, for instance, a definite color or the like.

Having now particularly described and ascertained the nature of my said invention and in what manner the same is to be performed, I declare that what I claim as my invention, and desire to secure by United States Letters Patent, is—

1. A magnesia cement consisting of a mixture substantially free from chlorin compounds and containing, in addition to magnesia and sulfates of bases not stronger than magnesia a salt of lead free from chlorin which can react with the magnesium compounds.

2. A magnesia cement consisting of a dry mixture substantially free from chlorin compounds and containing, in addition to magnesia and sulfates of bases not stronger than magnesia a salt of lead free from chlorin which can react with the magnesium compounds.

3. Magnesia cement consisting of a mixture substantially free from chlorin compounds and containing sulfate of magnesium and acetate of lead in addition to magnesia.

4. A method of manufacturing magnesia cement consisting in mixing a dry mixture of magnesia and sulfate of magnesium free from chlorin compounds in powdered condition with a salt of lead in dry and powdered condition, said salt being capable of entering into reaction with the magnesium mixture and which itself is free from chlorin.

In testimony whereof I have signed this specification in the presence of two subscribing witnesses.

WILLI JEROCH.

Witnesses:
    WOLDEMAR HAUPT,
    HENRY HASPER.